US012711587B2

(12) United States Patent
Horii

(10) Patent No.: US 12,711,587 B2
(45) Date of Patent: Aug. 18, 2026

(54) CAMERA SYSTEM MOUNTED ON MOVING BODY, CONTROL METHOD FOR CAMERA SYSTEM, IMAGE PROCESSING APPARATUS, AND IMAGE PROCESSING METHOD

(71) Applicant: CANON KABUSHIKI KAISHA, Tokyo (JP)

(72) Inventor: Yuya Horii, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 197 days.

(21) Appl. No.: 18/787,116

(22) Filed: Jul. 29, 2024

(65) Prior Publication Data

US 2025/0045886 A1 Feb. 6, 2025

(30) Foreign Application Priority Data

Aug. 4, 2023 (JP) ................................ 2023-127810

(51) Int. Cl.
*G06T 5/80* (2024.01)
*G06F 3/14* (2006.01)
(Continued)

(52) U.S. Cl.
CPC .................. *G06T 5/80* (2024.01); *G06F 3/14* (2013.01); *G06V 20/56* (2022.01); *H04N 23/631* (2023.01)

(58) Field of Classification Search
CPC .. G06T 5/80; G06T 3/047; G06T 3/18; G06T 3/4038; G06T 2207/20021; G06T 2207/20112; G06F 3/14; G06F 3/041; G06V 20/56; H04N 23/631; H04N 23/55; H04N 23/698; H04N 7/183; H04N 23/60;
(Continued)

(56) References Cited

U.S. PATENT DOCUMENTS

2013/0293672 A1* 11/2013 Suzuki ................ H04N 23/698 345/647
2016/0073025 A1 3/2016 Cilia
(Continued)

FOREIGN PATENT DOCUMENTS

EP 3886431 A1 * 9/2021 ............ G06T 11/00
JP 2008048443 A 2/2008
(Continued)

*Primary Examiner* — Jose L Couso
(74) *Attorney, Agent, or Firm* — Canon U.S.A., Inc. IP Division

(57) ABSTRACT

A camera system includes an image acquisition unit that acquires an image generated by an imaging unit installed to capture an image of a region above a moving body and configured to capture an optical image including a first region with high distortion corresponding to an angle of view less than a predetermined angle of view and a second region with lower distortion than the first region corresponding to an angle of view equal to or greater than the predetermined angle of view, a clipping angle-of-view setting unit that sets an angle of view at which a part of the captured image is to be displayed on a monitor, a distortion correction processing unit the performs distortion correction processing on an image clipped at the set angle of view, based on information on the set angle of view, and a monitor configured to display the distortion-corrected clipped image.

10 Claims, 6 Drawing Sheets

(51) Int. Cl.
*G06V 20/56* (2022.01)
*H04N 23/63* (2023.01)

(58) Field of Classification Search
CPC ............. H04N 23/2621; H04N 5/2628; H04N 5/2624; H04N 5/272; B60R 1/26; B60R 2300/105; B60R 2300/303; B60R 2300/8066; G08B 13/19641; G08B 13/19682; G08B 13/19689
See application file for complete search history.

(56) References Cited

U.S. PATENT DOCUMENTS

| | | | | |
|---|---|---|---|---|
| 2016/0080699 | A1* | 3/2016 | Scholl | G06T 3/08 348/148 |
| 2019/0197660 | A1 | 6/2019 | Kogure | |
| 2019/0208142 | A1* | 7/2019 | Kitaya | H04N 23/63 |
| 2023/0094232 | A1 | 3/2023 | Saito | |
| 2023/0100099 | A1 | 3/2023 | Saito | |

FOREIGN PATENT DOCUMENTS

| | | | | |
|---|---|---|---|---|
| JP | 2011193485 | A | 9/2011 | |
| JP | 2012127810 | A | 7/2012 | |
| JP | 2020052639 | A | 4/2020 | |
| JP | 7214475 | B2 * | 1/2023 | |
| JP | 7253693 | B2 * | 4/2023 | |
| WO | WO-2012081210 | A1 * | 6/2012 | H04N 23/633 |
| WO | WO-2014087594 | A1 * | 6/2014 | G06T 3/00 |
| WO | WO-2017213244 | A1 * | 12/2017 | H04N 7/188 |

* cited by examiner 502
10
501
110
50
120

FIG.2

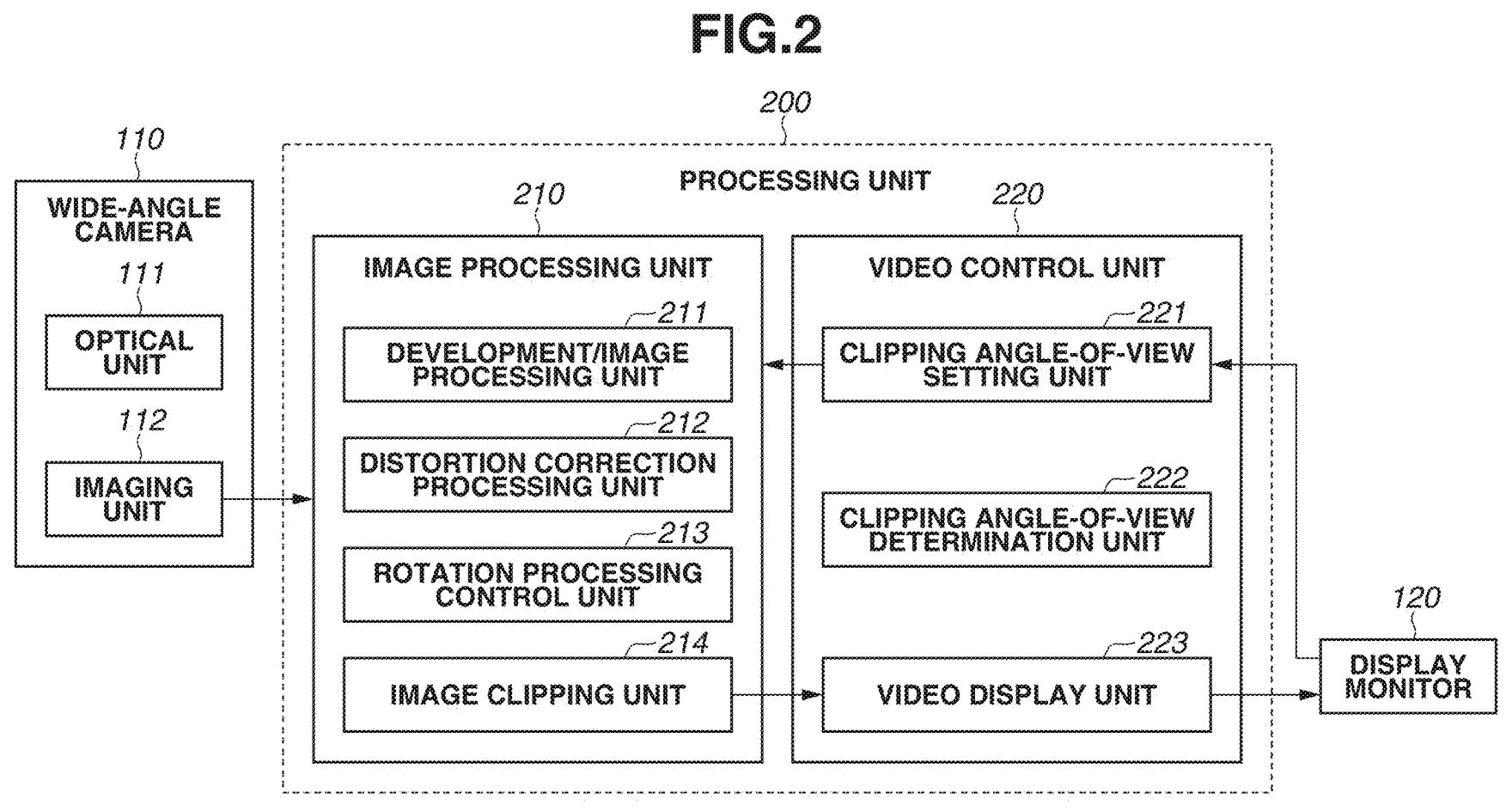

110 WIDE-ANGLE CAMERA
111 OPTICAL UNIT
112 IMAGING UNIT

200 PROCESSING UNIT

210 IMAGE PROCESSING UNIT
211 DEVELOPMENT/IMAGE PROCESSING UNIT
212 DISTORTION CORRECTION PROCESSING UNIT
213 ROTATION PROCESSING CONTROL UNIT
214 IMAGE CLIPPING UNIT

220 VIDEO CONTROL UNIT
221 CLIPPING ANGLE-OF-VIEW SETTING UNIT
222 CLIPPING ANGLE-OF-VIEW DETERMINATION UNIT
223 VIDEO DISPLAY UNIT

120 DISPLAY MONITOR

IMAGE HEIGHT y [mm]
HALF ANGLE OF VIEW θ [deg]
θmax
θa
501
502

CAMERA SYSTEM MOUNTED ON MOVING BODY, CONTROL METHOD FOR CAMERA SYSTEM, IMAGE PROCESSING APPARATUS, AND IMAGE PROCESSING METHOD

BACKGROUND OF THE INVENTION

Field of the Invention

The present invention relates to a camera system mounted on a moving body, and particularly to a camera system that clips a part of an omnidirectional video image captured by a wide-angle lens camera and displays the clipped image on a monitor.

Description of the Related Art

In recent years, there have emerged systems that perform 360-degree omnidirectional monitoring using a wide-angle lens camera installed on top of a moving body. For example, there is a system in which a fisheye lens camera is installed on top of an automobile or a small robot with its optical axis facing upward, and the captured image is clipped at an arbitrary angle of view and displayed on a monitor. A single fisheye lens camera can capture images at an elevation angle of about 90 degrees and an azimuth angle of about 360 degrees, which allows users to perform omnidirectional monitoring without the need for installing a plurality of cameras or pan/tilt drive units. Japanese Patent Application Laid-Open No. 2008-48443 discusses a method that takes advantage of the ability of a fisheye lens that can capture images over a wide area, in which a part of an image captured by a single fisheye lens camera is extracted or clipped at an angle of view of interest, the distortion of the clipped image is corrected, and the corrected image is displayed on a monitor.

However, in the fisheye lens camera discussed in Japanese Patent Application Laid-Open No. 2008-48443, imaging distortion occurs in a greater degree in the periphery of the lens, which is the monitoring area than in the center of the lens, and thus a resolution is lower in the periphery of the lens than in the center of the lens. As an example of improvement measures for such distortion, distortion correction processing may be performed on the captured image. However, this processing involves a process of enlarging the low-resolution image, which can lead to a reduction in the visibility of the image. As an example of methods for improving the low resolution, super-resolution processing may be performed. However, the super-resolution processing requires alignment and comparison of feature points at high frame rates. In addition, it may be assumed a case in which images at a plurality of angles of view are clipped and displayed on a monitor at once, so that this processing has an issue of increase in processing time and computational resources.

SUMMARY OF THE INVENTION

The present invention is directed to providing an image with little distortion from an image obtained by a wide-angle lens camera installed on top of a moving body and having projection characteristics in which a resolution is high at a peripheral angle of view. According to an aspect of the present invention, a camera system includes an image acquisition unit configured to acquire an image generated by an imaging unit installed so as to capture an image of a region above a moving body and configured to capture an optical image, wherein the optical image includes a first region with high distortion corresponding to an angle of view less than a predetermined angle of view and a second region with lower distortion than the first region corresponding to an angle of view equal to or greater than the predetermined angle of view, a clipping angle-of-view setting unit configured to set an angle of view at which a part of the image captured by the imaging unit is to be displayed on a monitor, a distortion correction processing unit configured to perform distortion correction processing on a clipped image that is clipped at the angle of view set by the clipping angle-of-view setting unit, based on information on the angle of view set by the clipping angle-of-view setting unit, and a monitor configured to display the clipped image on which the distortion correction has been performed.

Further features of the present invention will become apparent from the following description of exemplary embodiments with reference to the attached drawings.

BRIEF DESCRIPTION OF THE DRAWINGS

FIG. 2 is a diagram illustrating an example of a configuration of a camera system according to the exemplary embodiment.

DESCRIPTION OF THE EMBODIMENTS

Figure 1:
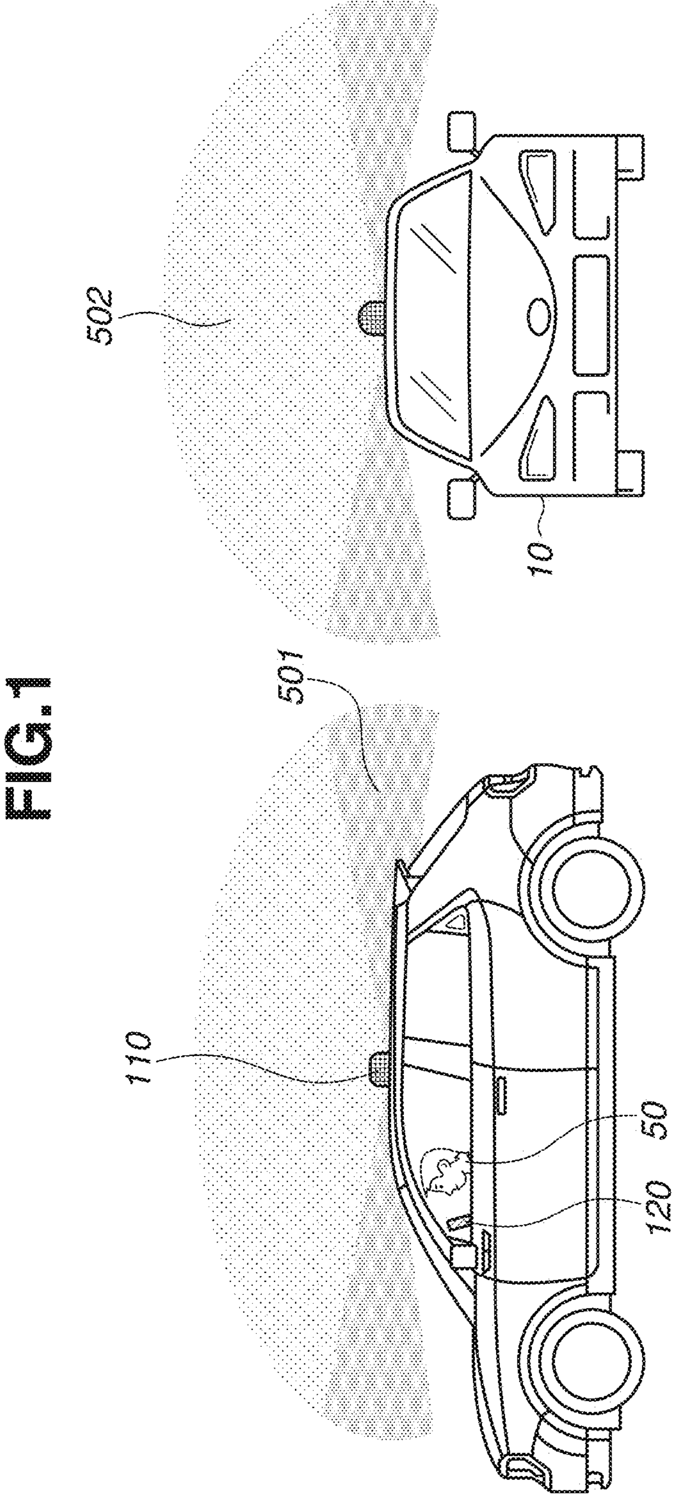
FIG. 1 is a diagram illustrating an example of a moving body and a mode of installation of a wide-angle camera on top of the moving body and a display monitor according to an exemplary embodiment.

Hereinafter, exemplary embodiments of a camera system according to the present invention will be described in detail with reference to the drawings. In the drawings, the same members or elements are given the same reference signs and numerals, and duplicate description thereof is omitted or simplified. The camera system according to the present invention can be embodied in various forms, and is not limited to only the exemplary embodiments described in the present specification.

FIG. 1 is a diagram illustrating an example of a moving body, a mode of installation of a wide-angle camera on top of the moving body and a display monitor according to the exemplary embodiment. A moving body 10 may be, for example, a vehicle, such as a commercial vehicle, illustrated in FIG. 1, a small size mobility vehicle that performs autonomous driving, or the like. A wide-angle camera 110 is a camera that can capture images over a wide area above the moving body, such as an elevation angle of about 100 degrees and an azimuth angle of about 360 degrees, for example. The wide-angle camera 110 is installed at a position where it can capture omnidirectional images, such as on top of the moving body 10. The imaging range of the wide-angle camera 110 includes a high-resolution region 501 where imaging is performed at a resolution higher than the average resolution, and a low-resolution region 502 where imaging is performed at a resolution lower than the average resolution. The wide-angle camera 110 has a projection characteristic such that, as the angle from the optical axis is larger, the high-resolution region 501 increases. A display monitor 120 is a liquid crystal display or the like, for example, which is a device that extracts or clips a part of an omnidirectional image captured by the wide-angle camera 110 and presents the clipped image as video image information to a user 50.

FIG. 2 is a diagram illustrating an example of a configuration of a camera system according to the present exemplary embodiment. The camera system includes the wide-angle camera 110, a processing unit 200, and the display monitor 120. The functions of the processing unit 200 can be executed by an image processing apparatus.

The wide-angle camera 110 includes an optical unit 111 and an imaging unit 112. The optical unit 111 has at least one lens, and has the role of forming an image of incident light from the outside on the light-receiving surface of the imaging unit 112. The wide-angle camera 110 includes an imaging element that captures an optical image formed by an optical system.

Details of the optical characteristics of the optical unit 111 will be described below with reference to FIG. 3. The imaging unit 112 is an image sensor with a structure of two-dimensionally arranged pixels, converts an optical image of a subject formed by the optical unit 111 into an electrical signal for each pixel, and transmits the electrical signal to a development/image processing unit 211. The image sensor may be a complementary metal oxide semiconductor (CMOS) image sensor or a charge-coupled device (CCD) image sensor, for example. The image sensor has red, green, and blue (RGB) color filters arranged for each pixel on the light-receiving surface in a Bayer array or the like. In addition, since the wide-angle camera 110 captures a 360-degree omnidirectional image, it is desirable to make a position where the optical axis intersects the light-receiving surface of the imaging unit 112 match the center of the light-receiving surface. However, if the monitoring area is limited to 180 degrees in front or the like, sensor shift may be performed.

The processing unit 200 includes an image processing unit 210 and a video control unit 220. The processing unit 200 includes a central processing unit (CPU) that performs calculations and control, a read only memory (ROM) and a random access memory (RAM) that are main storage devices (none of them are illustrated). The ROM stores basic setting data and a series of omnidirectional imaging display programs according to the present exemplary embodiment. The CPU calls a program according to the processing content from the ROM, loads the program into the RAM, and executes operations of the blocks.

The image processing unit 210 includes a development/image processing unit 211, a distortion correction processing unit 212, a rotation processing control unit 213, and an image clipping unit 214. The development/image processing unit 211 performs white balance adjustment and debayer processing on the image data in a Bayer array input from the wide-angle camera 110 to convert the image data into RGB raster-format image data. Furthermore, the development/image processing unit 211 performs various types of image processing, such as demosaicing, wide dynamic range (WDR) correction, gamma correction, look up table (LUT), and the like. The development/image processing unit 211 functions as an image acquisition unit that acquires an image generated by an imaging unit that captures an optical image formed by the optical system. The distortion correction processing unit 212 performs coordinate transformation and pixel interpolation processing on the image data to correct imaging distortion in the periphery of the lens, which is typical of wide-angle lenses. If the angle of view at which an image is to be clipped and displayed is inclined with respect to the pixel arrangement, the rotation processing control unit 213 performs coordinate transformation and pixel interpolation processing on the image data and then performs rotation processing on the image data such that the displayed video image is oriented to be horizontal and vertical to the pixel arrangement. The above-described development/image processing, distortion correction processing, and rotation processing may be performed as hardware processing, such as by using a field programmable gate array (FPGA) or the like, or may be performed as software processing, such as by using a CPU or the like. In a case where the above-described processing is performed as hardware processing, various kinds of processing can be performed at higher speeds and video images can be displayed with low delay. The image clipping unit 214 performs image clipping processing on the image data transmitted from the imaging unit 112 based on angle-of-view information set by a clipping angle-of-view setting unit 221 (described below). At this time, if a clipping angle-of-view determination unit 222 (described below) determines that distortion correction processing and rotation processing are necessary, the image clipping unit 214 performs various kinds of processing and then performs image clipping processing.

The video control unit 220 includes the clipping angle-of-view setting unit 221, the clipping angle-of-view determination unit 222, and a video display unit 223. The clipping angle-of-view setting unit 221 sets the coordinates of the angle of view at which a part of the omnidirectional image captured by the wide-angle camera 110 is to be clipped and displayed. As a method of setting the angle-of-view information, in the present exemplary embodiment, the user 50 arbitrarily sets the coordinate information on the angle of view using a user interface (UI) on the display monitor 120. Examples of UI operations include obtaining the coordinate values of four corners at the angle of view in conjunction with a drag and wheel operation using a mouse, a touch operation, such as sliding and pinching, on a touch panel, or a mouse operation, and directly inputting the coordinate values. Enlarging or reducing the clipping angle of view is instructed by a pinching operation. The parallel movement of the clipping angle of view is instructed by a slide operation, and the clipping angle of view is determined on the apparatus side. As another exemplary embodiment, if the angle of view of the monitoring area is fixed, the coordinate information on the angle of view at which an image is to be clipped is stored in advance in the ROM, and is read out from the ROM and set. The clipping angle-of-view determination unit 222 refers to the angle-of-view coordinate values set by the clipping angle-of-view setting unit 221 and determines whether to perform distortion correction processing or rotation processing in accordance with the display angle of view. A determination method for determining whether to perform various kinds of processing will be described below with reference to FIG. 4. The video display unit 223 performs video display control processing so that the image data clipped and transmitted by the image clipping unit 214 is displayed on the display monitor 120.

Figures 3A, 3B:
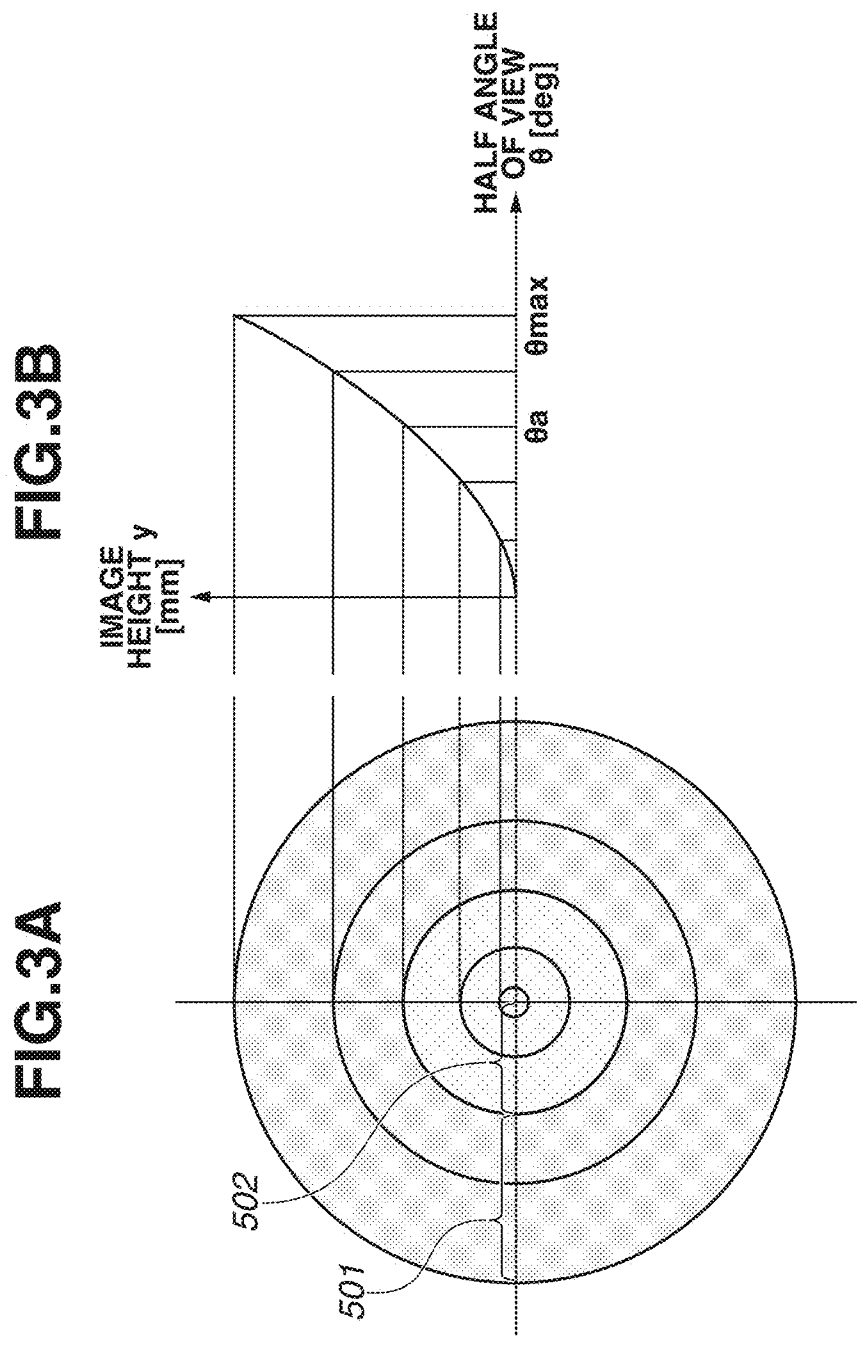
FIGS. 3A and 3B are diagrams illustrating an example of optical characteristics of an optical unit according to the exemplary embodiment.

Next, the optical system of the optical unit 111 included in the wide-angle camera 110 will be described in detail using FIGS. 3A, 3B, and 4. FIG. 3A is a diagram illustrating an image height y at each half angle of view on the light-receiving surface of the optical unit 111 according to the present exemplary embodiment in contour line form. FIG. 3B illustrates projection characteristics in which the horizontal axis indicates a half angle of view θ (the angle between the optical axis and the incident light beam), and the vertical axis indicates an image formation height (image height) y on the light-receiving surface (image plane) of the optical unit 111. As illustrated in the projection characteristics in FIG. 3B, the optical system of the optical unit 111 in the present exemplary embodiment is configured such that a projection characteristic y(θ) is different between a region with a small half angle of view θ (a region near the optical axis) and a region with a large half angle of view θ (a region away from the optical axis). That is, if the amount of increase in the image height y with respect to the half angle of view θ per unit (the number of pixels per unit angle) is defined as resolution, the resolution has a characteristic that differs depending on the angle of view. It can be said that this local resolution is higher as the interval between the contour lines of the image height y at the half angle of view θ in FIG. 3A is wider, or as the differential value dy(θ)/dθ (inclination) of the projection characteristic y(θ) in FIG. 3B is larger. In the present exemplary embodiment, a region of which the resolution is higher than the average resolution is defined as the high-resolution region 501, and a region of which the resolution is lower than the average resolution is defined as the low-resolution region 502.

The optical system of the optical unit 111 in the present exemplary embodiment has the projection characteristic y(θ) that satisfies the condition in the following Expression 1 or Expression 2. That is, the optical system of the optical unit 111 satisfies the following conditional expression (Expression 1):

$$0.1 < 2 \times f \times \tan(\theta max/2)/y(\theta max) < 1.2 \quad \text{(Expression 1)}$$

where f is a focal length of the optical system, θ is a half angle of view, y is an image height on the image plane, y(θ) is a projection characteristic representing the relationship between the image height y and the half angle of view θ, and θmax is the maximum half angle of view of the optical system.

More desirably, the optical system of the optical unit 111 satisfies the following conditional expression (Expression 2):

$$0.2 < 2 \times f \times \tan(\theta max/2)/y(\theta max) < 0.92 \quad \text{(Expression 2)}$$

Figure 4:
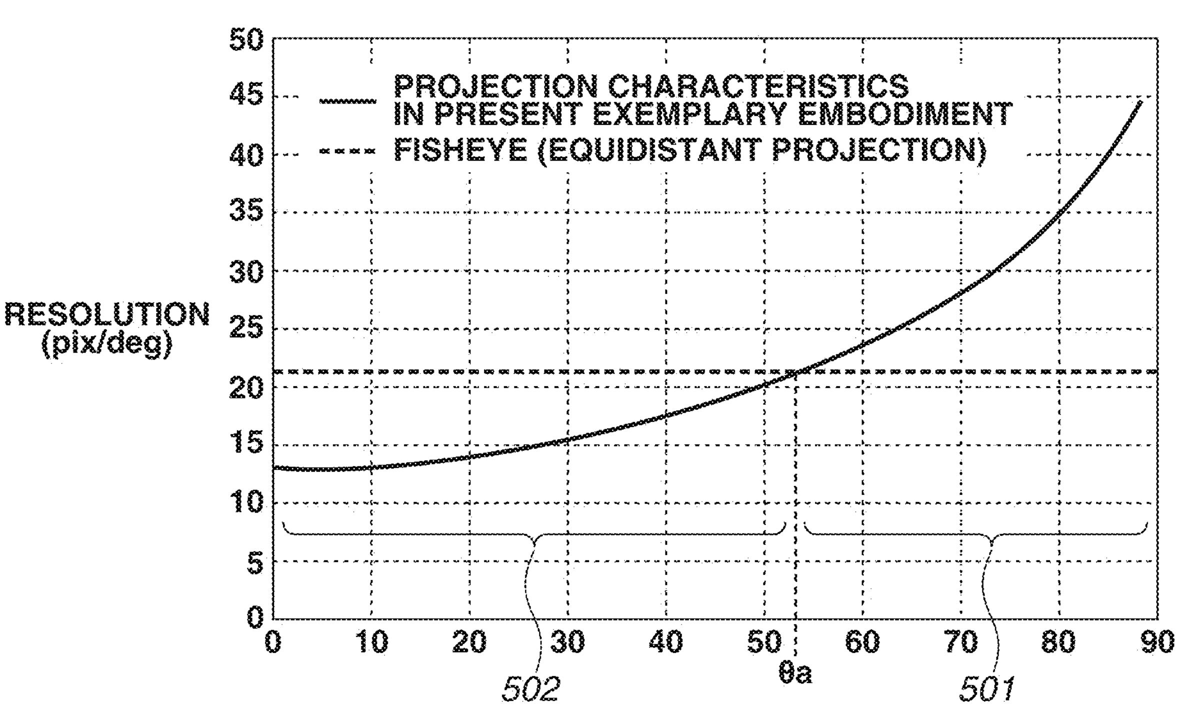
FIG. 4 is a diagram illustrating an example of projection characteristics when a horizontal axis shows a half angle of view θ and a vertical axis shows a resolution dy(θ)/dθ.

FIG. 4 is a diagram illustrating projection characteristics in which the horizontal axis indicates the half angle of view θ and the vertical axis indicates the resolution dy(θ)/dθ. In FIG. 4, the solid line shows an example of the projection characteristics in the present exemplary embodiment, and the dotted line shows the projection characteristics of an equidistant projection method used for conventional fisheye lenses and the like. As illustrated by the solid line in FIG. 4, the optical system of the optical unit 111 in the present exemplary embodiment has the high-resolution region 501 in which the resolution is higher than the average resolution when the half angle of view θ is equal to or greater than a predetermined half angle of view θa, and the low-resolution region 502 in which the resolution is lower than the average resolution when the half angle of view θ is less than the predetermined half angle of view θa. The region in which an angle of view is less than a predetermined angle of view corresponds to a high-distortion region. In the high-resolution region 501 in the lens peripheral portion of the optical system, it is possible to control the projection characteristic (aspect ratio) in a radiation direction and a circumferential direction with respect to the optical axis, and obtain an image with less distortion even in the peripheral region, as compared to conventional fisheye lenses. The region in which an angle of view is equal to or greater than the predetermined angle of view corresponds to a low-distortion region. Therefore, according to the camera system in the present exemplary embodiment, it is possible to directly clip the lens peripheral portion, which is the monitoring region, in accordance with the display angle of view, thereby improving the visibility of the image. In addition, it is not necessary to perform distortion correction processing and rotation processing for improving visibility, which has the effect of reducing processing time and calculation resources.

Figure 5:
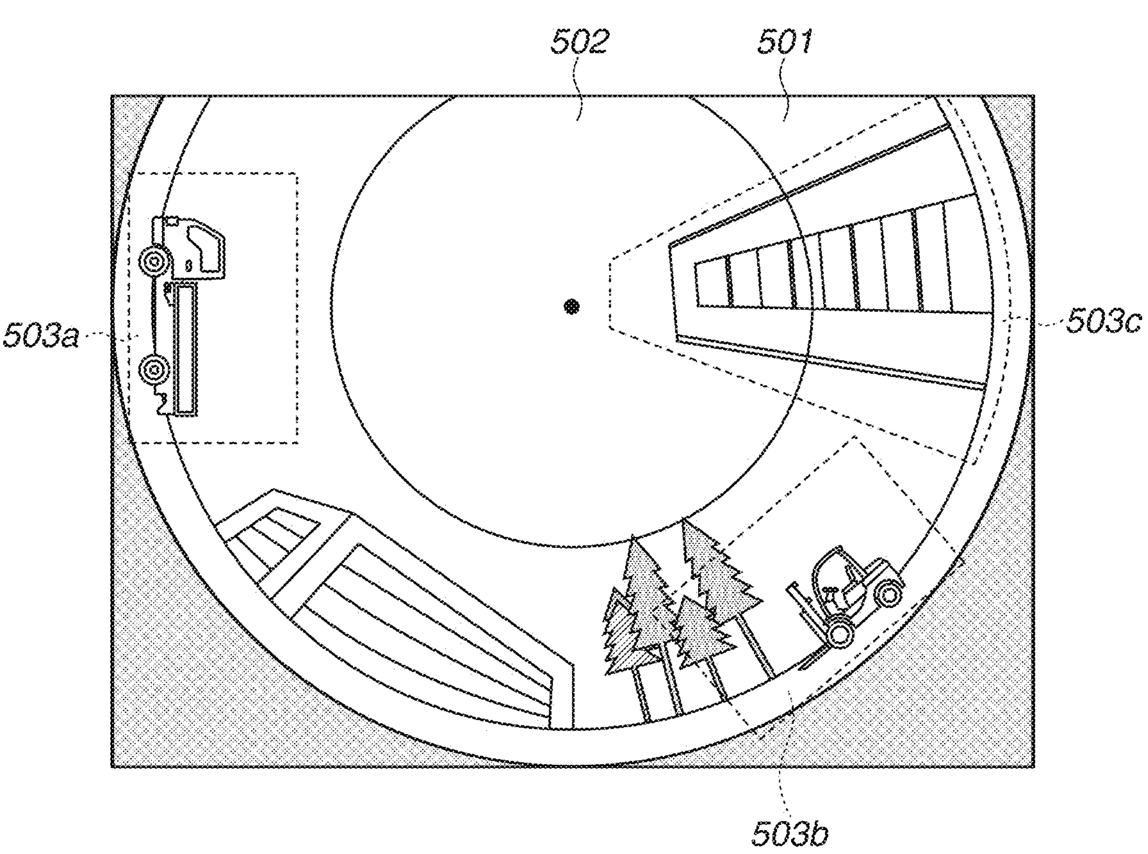
FIG. 5 is a diagram illustrating an omnidirectional image captured by the wide-angle camera, in which regions clipped and to be displayed on a display monitor are indicated by dotted lines.

Next, the determination method for determining whether to perform distortion correction processing or rotation processing on a clipped image when displaying the video image on the display monitor 120 will be described in detail with reference to FIG. 5. FIG. 5 is a diagram illustrating an omnidirectional image captured by the wide-angle camera 110. The regions to be clipped out of the omnidirectional image and displayed on the display monitor 120 are indicated by dotted lines. The wide-angle camera 110 in the present exemplary embodiment has a projection characteristic in which the high-resolution region 501 occupies at the lens peripheral portion where the half angle of view θ is large as illustrated in FIG. 5, and an image clipped out of the high-resolution region 501 has little distortion.

For example, in the case of clipping an image in a clipping region 503*a* in FIG. 5, the clipping region 503*a* fits within the high-resolution region 501, and is oriented in the horizontal and vertical directions with respect to the pixel arrangement of the image sensor. Thus, the image can be clipped and displayed without performing distortion correction processing and rotation processing. On the other hand, in the case of clipping an image in a clipping region 503*b*, the clipping region 503*b* fits within the high-resolution region 501, but is inclined with respect to the pixel arrangement of the image sensor, so that rotation processing needs to be performed. As a method for determining whether rotation processing is to be performed, there is a method for determining rotation processing is to be performed, by referring to the coordinate values of four corners at the clipping angle of view and determining whether the coordinate values in the radiation direction or the circumferential direction with respect to the optical axis match the referred coordinate values. In the case of clipping an image in a clipping region 503*c*, the clipping region 503*c* extends outside the high-resolution region 501. Thus, if the video image is directly displayed on the display monitor 120, the image may be significantly distorted and its visibility may be deteriorated, so distortion correction processing needs to be performed. As a method for determining whether the distortion correction processing is to be performed, there is a method for determining whether the distortion correction processing is to be performed, by referring to the coordinate values of four corners at the clipping angle of view and determining whether the number of pixels in the radiation direction and the circumferential direction with respect to the optical axis exceeds a predetermined value. These determination processes are executed on an interrupt basis each time the coordinate values at the angle of view are changed by the user 50 through UI operations or the like.

The CPU in the processing unit 200 performs processing in the blocks of the image processing unit 210 and the video control unit 220 by executing the omnidirectional imaging display program stored in the ROM. A sequential procedure of the omnidirectional imaging display processing will be described in detail with reference to the flowchart of FIG. 6.

Figure 6:
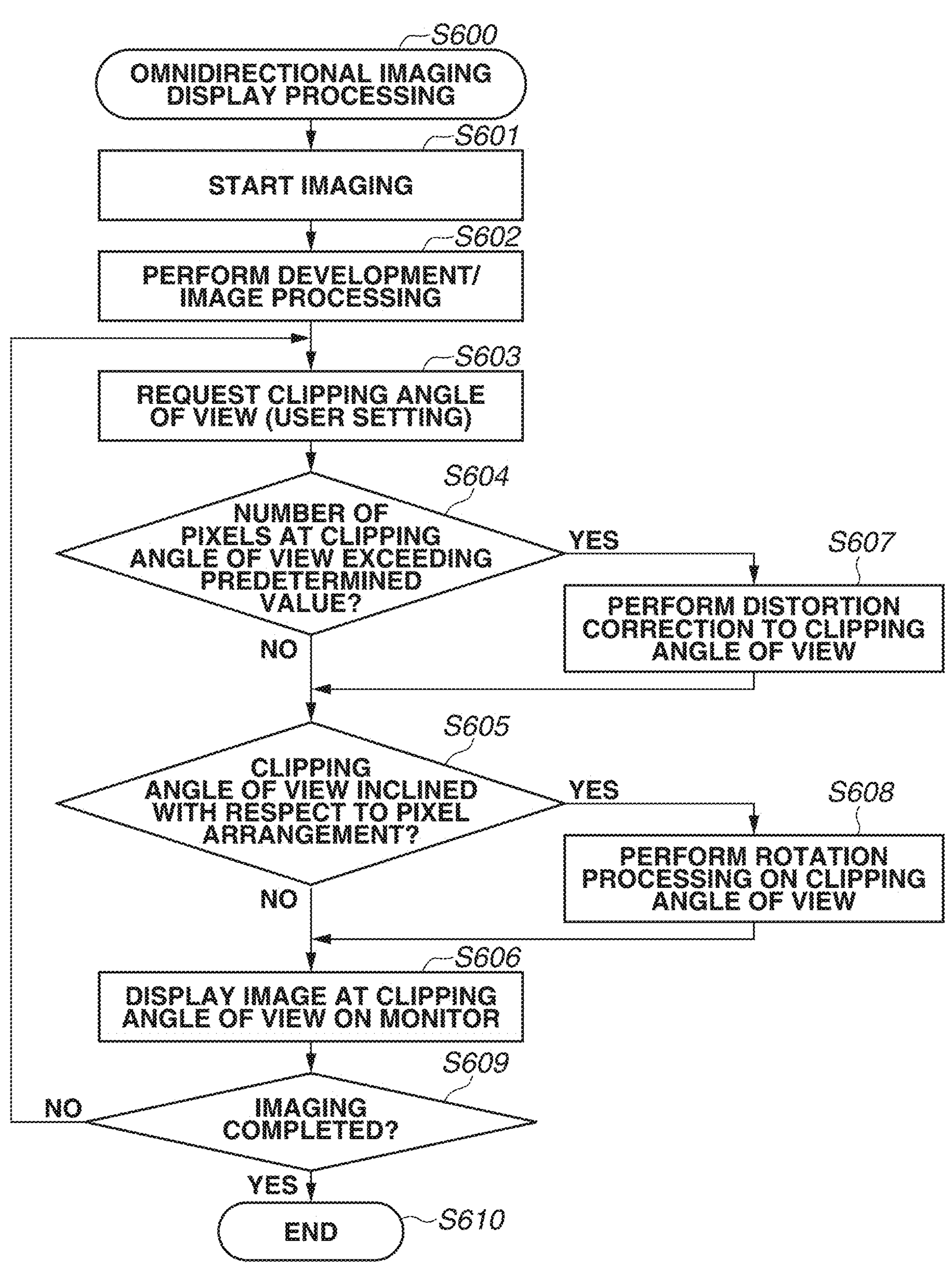
FIG. 6 is a flowchart illustrating an example of a camera image display process executed by a central processing unit (CPU) in a processing unit according to the exemplary embodiment.

FIG. 6 is a flowchart illustrating an example of the omnidirectional imaging display processing executed by the CPU in the processing unit 200 according to the present exemplary embodiment. In step S600, the CPU of the processing unit 200 starts the omnidirectional imaging display processing. In step S601, when the power source (for example, a battery) of the moving body 10 enters a startup state, the wide-angle camera 110 starts omnidirectional imaging.

In step S602, the development/image processing unit 211 performs development processing and various kinds of image processing on the image captured by the wide-angle camera 110.

In step S603, the clipping angle-of-view setting unit 221 sets the angle-of-view information at which an image is to be clipped from the captured image and displayed on the display monitor 120. As a method for setting the angle-of-view information, a request is made of the user 50 to input coordinate information on the angle of view using an UI. It is needless to say that the coordinate information on the angle of view at which an image is to be clipped can be stored in advance in the ROM.

In step S604, the clipping angle-of-view determination unit 222 refers to the coordinate values of four corners at the clipping angle of view, based on the coordinate information on the angle of view set by the clipping angle-of-view setting unit 221, and determines whether the number of pixels in the radiation direction and the circumferential direction with respect to the optical axis exceeds a predetermined value. If it is determined that the number of pixels in the radiation direction and the circumferential direction with respect to the optical axis exceeds the predetermined value (YES in step S604), the process proceeds to step S607. On the other hand, if it is determined that the number of pixels in the radiation direction and the circumferential direction with respect to the optical axis of the clipping angle of view does not exceed the predetermined value (NO in step S604), the process proceeds to step S605.

In step S605, the clipping angle-of-view determination unit 222 determines whether the clipping angle of view is inclined with respect to the pixel arrangement of the image sensor, based on the coordinate information on the angle of view set by the clipping angle-of-view setting unit 221. If it is determined that the clipping angle of view is inclined with respect to the pixel arrangement of the image sensor (YES in step S605), the process proceeds to step S608. On the other hand, if it is determined that the clipping angle of view is horizontal and vertical with respect to the pixel arrangement of the image sensor (NO in step S605), the process proceeds to step S606.

In step S606, the image clipping unit 214 clips a part of the captured omnidirectional image at the angle of view set by the clipping angle-of-view setting unit 221, and the video display unit 223 performs control to display the clipped image on the display monitor 120. If the clipping angle-of-view determination unit 222 determines that distortion correction processing and rotation processing are unnecessary, the image clipped out of the omnidirectional image is directly displayed.

In step S607, the distortion correction processing unit 212 performs distortion correction processing on the captured image at the angle of view set by the clipping angle-of-view setting unit 221. Thereafter, the process proceeds to step S608.

In step S608, the rotation processing control unit 213 performs rotation processing on the captured image at the angle of view set by the clipping angle-of-view setting unit 221. Thereafter, in step S606, the captured image having undergone the various kinds of processing is displayed.

In step S609, the image processing unit 210 determines whether imaging by the wide-angle camera 110 has been completed. If it is determined that the imaging has been completed (YES in step S609), the process proceeds to step S610. On the other hand, if it is determined that imaging is continuing (NO in step S609), the process is executed again from step S603.

In step S610, the video display unit 223 ends the video display on the display monitor 120. After step S610, the execution of the series of steps of the omnidirectional imaging display processing is completed, and when the next imaging operation of the wide-angle camera 110 is started, the process is executed again from step S600.

By the above-described processing, the camera system can clip and display the captured image of the lens peripheral portion, which is the monitoring area, with low distortion and high resolution according to the display angle of view. This has the effect of improving the visibility of the image and saving the processing time and computational resources.

The present invention has been described above in detail based on exemplary embodiments. However, the present invention is not limited to these specific exemplary embodiments, and may be modified in various forms without departing from the gist of the invention.

In the present exemplary embodiment, the projection characteristics of the optical unit 111 in the wide-angle camera 110 are exemplified by the characteristics illustrated in Expressions 1 and 2 and FIG. 4. However, the projection characteristics of the optical unit 111 may be changed depending on the installation height of the wide-angle camera 110 and the range to be monitored. For example, if the wide-angle camera 110 is installed at a low position, an optical unit 111 having a projection characteristic with a small inclination of a curve of the half angle of view $\theta$ relative to the resolution may be used so that the high-resolution region 501 becomes wider, i.e., the predetermined half angle of view $\theta a$ illustrated in FIG. 4 is shifted toward a lower angle of view.

The present invention can also be implemented by executing the process described below. That is, software (programs) for implementing the functions of the above-described exemplary embodiment are supplied to a system or apparatus via a network or various storage media, and a computer (e.g., a CPU, an MPU, or the like) of the system or apparatus reads and executes the programs. The programs may also be provided by recording them on a computer-readable recording medium.

According to an aspect of the present invention, it is possible to obtain a captured image of a surrounding area of a moving body with little distortion.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-127810, filed Aug. 4, 2023, which is hereby incorporated by reference herein in its entirety.

What is claimed is:

1. A camera system comprising:

an image acquisition unit configured to acquire an image generated by an imaging unit, the imaging unit being installed so as to capture an image of a region above a moving body and configured to capture an optical image, the optical image including a first region with high distortion corresponding to an angle of view less than a predetermined angle of view and a second region with lower distortion than the first region corresponding to an angle of view equal to or greater than the predetermined angle of view;

a clipping angle-of-view setting unit configured to set an angle of view at which a part of the image captured by the imaging unit is to be displayed on a monitor;

a distortion correction processing unit configured to perform distortion correction processing on a clipped image that is clipped at the angle of view set by the clipping angle-of-view setting unit, based on information on the angle of view set by the clipping angle-of-view setting unit; and a monitor configured to display the clipped image on which the distortion correction has been performed.

2. The camera system according to claim 1, wherein the distortion correction processing unit performs the distortion correction processing in a case where the clipping angle of view set by the clipping angle-of-view setting unit includes the first region, and does not perform the distortion correction processing in a case where the clipping angle of view does not include the first region.

3. The camera system according to claim 1, further comprising a rotation processing control unit configured to perform rotation processing in a case where the clipping angle of view set by the clipping angle-of-view setting unit is inclined with respect to pixel arrangement of the imaging unit, and does not perform the rotation processing in a case where the clipping angle of view is not inclined with respect to the pixel arrangement of the imaging unit.

4. The camera system according to claim 1, wherein the imaging unit includes:

an optical system configured to form the optical image; and an imaging element configured to capture the optical image formed by the optical system.

5. The camera system according to claim 1, wherein the second region with lower distortion than the first region and first region with high distortion correspond to a high-resolution region and a low-resolution region of the optical image, respectively.

6. The camera system according to claim 4, wherein the optical system satisfies the following conditional expression:

$$0.1 < 2 \times f \times \tan(\theta\max/2)/y(\theta\max) < 1.2,$$

where f is a focal length, θ is a half angle of view, y is an image height on an image plane, y(θ) is a projection characteristic representing a relationship between the image height y and the half angle of view θ, and θmax is a maximum half angle of view of the optical system.

7. The camera system according to claim 1, wherein the clipping angle-of-view setting unit determines coordinate information on the clipping angle of view based on a user interface (UI) operation, such as a touch operation or a mouse operation.

8. A control method for a camera system, the control method comprising:

acquiring an image generated by an imaging unit, the imaging unit being installed so as to capture an image of a region above a moving body and configured to capture an optical image, the optical image including a first region with high distortion corresponding to an angle of view less than a predetermined angle of view and a second region with lower distortion than the first region corresponding to an angle of view equal to or greater than the predetermined angle of view;

setting an angle of view at which a part of the image captured by the imaging unit is to be displayed on a monitor;

performing distortion correction processing on a clipped image that is clipped at the angle of view set in the setting, based on information on the angle of view set in the setting; and displaying the clipped image on which the distortion correction has been performed on a monitor.

9. An image processing apparatus comprising:

an image acquisition unit configured to acquire an image generated by an imaging unit, the imaging unit being installed so as to capture an image of a region above a moving body and configured to capture an optical image, the optical image including a first region with high distortion corresponding to an angle of view less than a predetermined angle of view and a second region with lower distortion than the first region corresponding to an angle of view equal to or greater than the predetermined angle of view;

a clipping angle-of-view setting unit configured to set an angle of view at which a part of the image captured by the imaging unit is to be displayed on a monitor;

a distortion correction processing unit configured to perform distortion correction processing on a clipped image that is clipped at the angle of view set by the clipping angle-of-view setting unit, based on information on the angle of view set by the clipping angle-of-view setting unit; and a display control unit configured to display the clipped image on which the distortion correction has been performed on a monitor.

10. An image processing method comprising:

acquiring an image generated by an imaging unit, the imaging unit being installed so as to capture an image of a region above a moving body and configured to capture an optical image, the optical image including a first region with high distortion corresponding to an angle of view less than a predetermined angle of view and a second region with lower distortion than the first region corresponding to an angle of view equal to or greater than the predetermined angle of view;

setting an angle of view at which a part of the image captured by the imaging unit is to be displayed on a monitor;

performing distortion correction processing on a clipped image that is clipped at the angle of view set in the setting, based on information on the angle of view set in the setting; and displaying the clipped image on which the distortion correction has been performed on a monitor.

* * * * *